Aug. 21, 1928.
A. ELLIOTT
1,681,528
PROCESS FOR RECOVERING COPPER FROM ITS ORES
Original Filed March 17, 1924
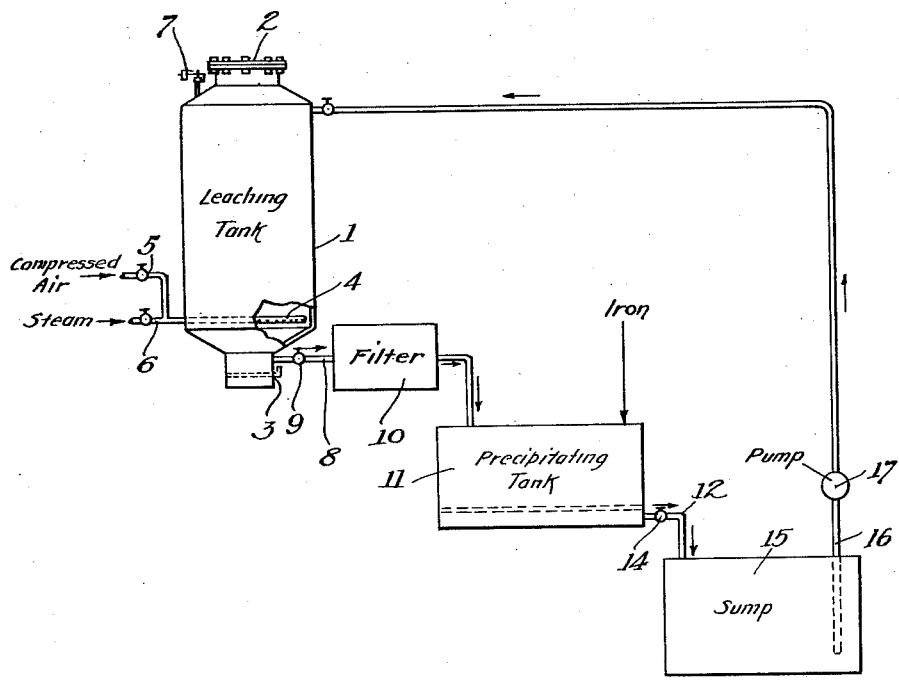
WITNESS:
INVENTOR
Alexander Elliott,
BY
Arthur P. Knight
ATTORNEY Patented Aug. 21, 1928.

1,681,528

UNITED STATES PATENT OFFICE.

ALEXANDER ELLIOTT, OF LOS ANGELES, CALIFORNIA.

PROCESS FOR RECOVERING COPPER FROM ITS ORES.

Application filed March 17, 1924, Serial No. 699,777. Renewed June 23, 1927.

This invention relates to recovery of copper from oxide, or oxidized ores thereof, and the main object of the invention is to provide for rapid and economical extraction of the copper.

According to my present invention, the ore is leached with a solution of ferrous sulphate in the presence of air passed or distributed through such solution under pressure in excess of atmospheric pressure and at a suitable temperature, preferably in excess of ordinary atmospheric temperatures. Under such conditions of pressure and temperature, the ferrous sulphate is rapidly oxidized to ferric sulphate and the ferric sulphate reacts with the oxidized copper content of the ore to produce a solution of copper sulphate. Such solution is then treated in usual manner to produce metallic copper.

The accompanying drawing illustrates in diagrammatic elevation an apparatus suitable for carrying out my invention.

The apparatus shown in the drawing comprises a leaching tank 1 and suitable apparatus for receiving the solution from said leaching tank, and extracting the copper therefrom. Leaching tank 1 is of sufficient size to hold a batch of ore to be treated, and so constructed as to be able to withstand considerable pressure, say about 30 pounds per square inch, and also to resist corrosion by the leaching solution used. For this purpose the tank 1 may be formed of wood suitably supported or mounted to stand the said pressure, or it may be of iron or steel construction lined with wood, lead or other resistant material.

Tank 1 may be provided with suitable means, such as a manhole 2 or charging opening at its top, for charging the same with ore, and with a gate 3 or other suitable means at its bottom for discharging the ore residue. Means are also provided for supplying compressed air, preferably together with steam, to tank 1, said means comprising, for example, a perforated distributing pipe 4, extending in the lower part of said tank and connected to a pipe 5 for supplying compressed air from a suitable source at a pressure of, say, 30 pounds to the square inch, and to a pipe 6 for supplying steam at about the same pressure and a temperature corresponding to such pressure. Suitable pressure controlling means, such as a relief valve 7 is provided for maintaining a definite pressure in the tank 1.

From tank 1 a solution discharge pipe 8, provided with a valve 9, leads to a filter 10, having an outlet for conducting filtered liquid to a precipitating tank 11. A pipe 12 having valve 14 conducts the barren and regenerated solution from tank 11 to sump 15. Suitable means, such as pump 17 and pipeline 11 are provided for returning the regenerated solution from the sump to the leaching tank 1.

My process can be carried out in the above described apparatus as follows:

A solution of ferrous sulphate is placed in the tank 1 and the ore in suitably divided condition, for example crushed to about 40 mesh, is placed in said tank and the manhole cover is then tightly closed and steam and air are admitted to the tank at suitable pressure, for example at a pressure of about 30 pounds per square inch. The relief valve 7 is adjusted so that it will allow escape of residual air at say about 30 pounds pressure so that this pressure is always maintained within the tank and throughout the body of solution and ore mixed therewith but there is continual upward passage of the air through the material in the tank and a continuous supply of steam to such material, the effect of this operation being to continually agitate the material and to expose it to the heating action of the steam and to the oxidizing action of the air. While the air and steam may be applied together, it is obvious that they may in some cases be supplied separately to the tank, and I prefer in general to first supply steam to the tank so as to bring the charge to the required temperature, for example, to approximately the temperature of saturated steam at 30 pounds pressure or to any temperature between atmospheric temperature and the temperature of steam supplied to the tank. When the charge has thus been brought to the proper temperature, the compressed air may be turned into the tank, such air being preferably heated, for example by supplying sufficient steam therewith to heat the same so as to maintain the required temperature in the tank. The air so supplied to the tank passes through and is distributed in contact with the solution and oxidizes ferrous sulphate in the solution to ferric sulphate and such ferric sulphate at once acts on the copper content of the ore, for example, copper oxide, carbonate, or silicate to form copper sulphate in solution. Under these conditions no ferric sulphate will accumulate but as soon as the ferric salt is formed it will react to produce copper sulphate. In the course of a few hours all the copper in the ore will have become dissolved and the charge is ready for filtering.

The changes are expressed as follows:

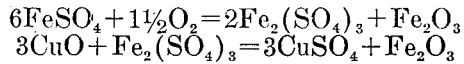

In making up the charge 2.5 lbs. of dry $FeSO_4$ is preferably allowed for 1 lb. Cu in the ore. If water of crystallization is present this must be added to the weight of the $FeSO_4$ used. The filtered solution contains all the copper as $CuSO_4$. The copper is precipitated with iron as follows:

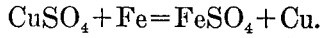

The $FeSO_4$ solution after separating from the copper is pumped back to the leaching tank and used for a new charge.

It will be understood that in carrying out my invention any pressure in excess of atmospheric pressure may be maintained in the leaching tank and the temperature of the solution during the leaching operation may be maintained at any temperature in excess of atmospheric temperature. The rapidity of the leaching operation increases both with the temperature of the solution and with the pressure of the air supplied thereto, and the amount of heat and air supplied under any condition will depend upon the economical requirements of the process.

What I claim is:

1. The process of extracting copper from its ores which comprises subjecting the ore to the action of a solution of ferrous sulphate in the presence of air distributed in contact with such solution at a pressure in excess of atmospheric pressure and maintaining a pressure in excess of atmospheric pressure throughout the body of solution and ore mixed therewith.

2. The process of extracting copper from its ores which consists in subjecting the ore to the action of a solution of ferrous sulphate in the presence of air distributed in contact with such solution at a pressure in excess of atmospheric pressure and at a temperature in excess of atmospheric temperature and maintaining a pressure in excess of atmospheric pressure throughout the body of solution and ore mixed therewith.

3. The process which consists in applying to an ore containing copper in oxidized form a solution of ferrous sulphate, heating the solution and ore and forcing into and through the solution air in excess of atmospheric pressure while maintaining a pressure in excess of atmospheric pressure throughout the body of ore and solution.

4. The process which consists in charging ore and ferrous sulphate solution into a receptacle, closing said receptacle, forcing steam into said receptacle to heat the solution and ore and forcing compressed air into and through the contents of the receptacle so as to produce throughout the body of solution and ore a pressure in excess of atmospheric pressure and distribute such air in contact with the solution.

In testimony whereof I have hereunto subscribed my name this 5th day of March, 1924.

ALEXANDER ELLIOTT.